United States Patent [19]
Polaert et al.

[11] 3,838,996

[45] Oct. 1, 1974

[54] METHOD OF MANUFACTURING A SECONDARY-EMISSIVE CHANNEL PLATE COMPRISING CURVED CHANNELS

[75] Inventors: Remy Henri Francois Polaert, Villecresnes; Valere Dominique Louis Duchenois; Michel Jean Claude Monnier, both of Paris; Jacques Charles Louis Bunel, Vigneux Sur Seine, all of France

[73] Assignee: U.S. Philips Corporation, New York, N.Y.

[22] Filed: Jan. 15, 1973

[21] Appl. No.: 323,846

[30] Foreign Application Priority Data

Jan. 24, 1972 France .............................. 72.02226

[52] U.S. Cl. .............................. 65/4, 65/36, 65/102, 65/108, 65/111, 65/DIG. 7, 350/96 B

[51] Int. Cl. .......................... C03c 23/20, G02b 5/14

[58] Field of Search .......... 65/DIG. 7, 3, 4, 36, 111, 65/102, 108; 313/95, 68; 350/96 B

[56] References Cited

UNITED STATES PATENTS

| | | | |
|---|---|---|---|
| 3,166,395 | 1/1965 | Hicks, Jr. | 65/4 |
| 3,211,540 | 10/1965 | Cole | 65/4 |
| 3,244,922 | 4/1966 | Wolfgang | 313/95 |
| 3,374,380 | 3/1968 | Goodrich | 313/95 X |
| 3,677,730 | 7/1972 | Dedadoorian et al. | 65/36 |

*Primary Examiner*—S. Leon Bashore
*Assistant Examiner*—F. W. Miga
*Attorney, Agent, or Firm*—Frank R. Trifari

[57] ABSTRACT

So as to obtain curved channels in a channel plate having secondary electron emission, a non-uniform temperature distribution is realized in at least one thickness portion of a channel plate in which the said channels are to be formed. This non-uniform temperature distribution is such that the glass is in a state between the elastic state and the viscous state, while at the same time the plate is subjected to a mechanical stress which acts on the plate surfaces at an angle.

14 Claims, 11 Drawing Figures

METHOD OF MANUFACTURING A SECONDARY-EMISSIVE CHANNEL PLATE COMPRISING CURVED CHANNELS

The invention relates to a method of manufacturing a secondary-emissive channel plate for electron tubes, the said channel plate being formed by a body of a material of low electrical conductivity which has an entrance boundary face and an exit boundary face and which comprises channels whose internal surfaces are capable of secondary emission which is to be generated by applying a potential difference between said boundary faces and which has an emission coefficient larger than 1, the channels extending along a curved path between the two boundary faces.

Due to the curvation of the channels, the parasitic electron and radiation emission can be reduced on the one hand, whilst the parasitic light transmission via the channels is reduced on the other hand.

Causes of parasitic electron emission are the ionization of residual gas molecules and the formation of X-rays, particularly near the exit of the channel plate when the intensification amplification is high. Due to the potential gradient and the absence of obstructions, the ions, and more in general the particles formed by the reaction with the electrons, penetrate into the channels. Collision with the walls of the channels causes the formation of parasitic electrons which will be multiplied more as they are formed deeper in the interior of the channels, i.e. nearer to the entrance face of the channel plate. This electron multiplication becomes manifest in the form of lagging pulses, the amplitude of which can equal that of the signal. Parasitic radiation emission can then occur, notably in the form of X-rays which can be attributed to the re-combination of returning ions and electrons. This additional radiation changes the signal measured via the photocathode. The collision of said returning ions with the walls of the channels can damage these walls.

However, if the channels have a given curvation, the curvation obstructs the movement of the ions and reaction particles inside the channels, and hence also the parasitic electron and radiation emission and the direct light transmission. This can be the case with light which is admitted directly on the entrance of the channel plate and which subsequently travels to the exit thereof, and with light which results from the optical reaction with the electrons from the screen which is arranged near the entrance of the channel plate, these electrons travelling to the entrance of the channel plate.

An electrode of this kind is described in U.S. Pat. No. 3,461,332 which, however, does not describe a method of realizing the curvation of the channels.

Methods of manufacturing such an electrode are described in French Patent Application No. 7,044,663 in the name of Applicant which was filed Dec. 11, 1970.

The method used consists in the formation of a bundle of fibres of the type forming channel plates, i.e., either a fibre having the shape of an envelope of hard glass with a core of soluble glass, or a fibre in the form of hard glass which covers a metal core, or a fibre in the form of a hollow glass tube which is filled with a neutral gas, and furthermore in the clamping of said bundle by its two ends between two clamps, one of which is stationary whilst the other can be vertically and horizontally displaced or rotated about the bundle axis, the said bundle being heated between the two clamps to the softening temperature of the glass. The desired channel plate can subsequently be obtained from the bundle thus deformed by cutting it from the deformed part of the bundle.

A method of this kind has the drawback that a comparatively large quantity of basic material which has already been processed to fibre bundles must be available, this material being partly wasted after the curvation and the cutting of the bundles.

A method which is more economical as regards the quantity of basic material used for the formation of fibre bundles would be, for example, a method in which initially straight fibres are used and in which the plate is subsequently deformed under the influence of a mechanical stress which is active during a period in which the glass is heated to approximately the softening point.

In this manner it is possible, for example, to shift one of the surfaces of the plate with respect to the other surface, these surfaces remaining substantially parallel during this treatment, but the fibres being curved to a given extent.

However, in that case numerous problems arise which relate particularly to the reaction forces occuring in the basic material when the latter is subjected to the relevant stress. However, these reaction forces differ as regards direction and modulus from one point in the body to another, even if the stress is uniformly distributed as regards direction and magnitude. As a result, the deformation differs from point to point.

The stress can be realized, for example, by pressure forces which act on all points of the plate surfaces at an angle, this angle facilitating the desired shift.

The behaviour of the channel plate under the influence of such a pressure force is difficult to describe exactly. This behaviour can be summarized by making a distinction between the influences of components which are perpendicular to the pressure faces on the one side, and components which are tangentially directed in these faces on the other hand.

The effect of the perpendicular directed components differs for points situated at the centre of the plate and those situated towards the circumference; at the centre each fibre is individually maintained in shape and position by all other fibres which are uniformly distributed about the fibre under consideration; the reaction forces against the deformation of said fibres are directed transverse to said surfaces.

However, the reaction of the fibres in the centre to the effect of said perpendicularly directed components is stronger than the reaction of the fibres which are situated at the plate circumference. The reaction of the basic material during the deformation, consequently, gives rise to a resultant which is at right angles with the pressure components which are directed perpendicular to the surfaces.

Consequently, under the influence of the latter components the deformation of the plate is small in the centre, whilst at the circumference of the plate the deformation can be barrel-like due to the fact that the fibres tend to become comparatively thicker at this area than the fibres in the centre of the plate, whilst they also tend to bend towards the outer side of the plate. This results in a curvation of the glass fibres which is substantially equal to zero in the centre of the plate and which is very irregular in the other parts of the plate.

The anticipated effect of the tangential components is a given shearing of the material, but a shearing such that the fibres are subjected to curvation which is accompanied by undesired bending of the channel plate, this bending being more likely to occur as the thickness-to-diameter ratio of the plate is smaller. In commonly used channel plates the thickness is, for example, 2.5 mm and the diameter is 25 mm.

It is to be noted that the horizontal components of the uniformly distributed pressure forces oppose the said bending and tend to compensate for the lack of rigidity of the plate.

Another form of stress which would also lead to a deformation involving a shift of one of the plate surfaces with respect to the other surfaces and which would impart a given curvation to the fibres is, for example, the method employing tensile forces acting on the two plate surfaces at an angle in two opposite directions. For the same reasons as already stated, the channel plate would then believe as follows. The tensile force components which are directed perpendicular to the surface would cause little deformation in the centre of the plate, whilst the edges thereof would tend to become concave, the diameter of the edge fibres then becoming smaller with respect to the diameter of the fibres in the centre of the plate and said edge fibres tending to be stretched and bent towards the innerside of the plate, which would also result in fibre curvation which is equal to zero in the centre of the plate and which changes in the direction of the plate circumference. Under the influence of the tangentially directed components a shearing effect as in the case of the pressure forces would occur and also a given bending of the channel plate; this bending would be prevented in a favourable sense by the components which are directed perpendicular to the plate surfaces.

It is thus established that, when use is made of a stress which acts on the plate surfaces at an angle in order to obtain the desired deformation of the plate, the said perpendicularly directed components are required so as to prevent bending phenomena of the plate, even though these components have given drawbacks.

One of the objects of the invention is to provide a method of deformation which is based on the use of a stress (including a component thereof) which is directed onto the plate surfaces at an angle (e.g., obliquely), so that one of the plate surfaces is shifted with respect to the other plate surface whilst, in order to prevent bending of the plate, use is made of the stress components which are directed perpendicular to the plate without these components giving rise to effects in all directions in the interior of the channel plate, i.e., circumferential bending effects of the fibres which are exerted in all directions.

By taking measures which are the subject of the present invention, the said effects, exerted in all directions, are reorientated during the deformation and they are "channelled" in the direction of the shifting of the one plate surface with respect to the other plate surface.

The method of manufacturing a channel plate comprising curved channels according to the invention is characterized in that a plate consisting of straight fibres is subjected to the influence of a mechanical stress which acts on the plate surfaces at an angle, the planes which are situated in the interior of the plate being isothermal, whilst in at least a portion of the plate thickness the temperature distribution according to a perpendicular to the plate faces is irregular such that in said thickness portion the glass is in a state between the viscous state and the elastic state, the glass in the other thickness portions being completely out of the viscous state.

The invention is furthermore characterized in that the stress is exerted on the faces of the plate via another body which is formed by two parts which slide on each other, each part making proper contact with one of the plate surfaces or also with given parts of the side surface of the plate, the shape of each of said parts being adapted to ensure that the deformation is not accompanied by swelling phenomena of the plate or the outward bending of the fibres at the circumference in directions which are approximately perpendicular to the shift direction, whilst in general the bending of the fibres is reorientated during the shift under the influence of the tangentially directed stress components such that the direction of the convexity of said bends coincides everywhere with the direction of shifting.

In the embodiment of the method according to the invention where the stress is produced by a pressure force, the plate is clamped in a die consisting of two parts, the internal shape of these parts corresponding to the shape of the plate, a given clearance being present between said parts in order to allow the shifting of one part with respect to the other.

The invention is further characterized in that the width of the inner side edges of the die varies, this width being larger and maximum in the diametrical sections which are situated near the diametrical section which is perpendicular to the shift direction, whilst the width is small and minimum in the diametrical sections which are situated near the section which is parallel to the shift direction.

In another embodiment of the method according to the invention the intermediate body used for exerting the stress is formed by two blocks, one block being attached to one of the plate surfaces and the other to the other plate surface, the basic material of these blocks having a deformation which is negligible with respect to that of the glass of the plate at the relevant temperature and operating stress.

The blocks are advantageously made of glass which is dissolved by the same solvent which dissolves the glass of the fibre cores.

The invention will be described hereinafter with reference to the drawings, in which.

For the description of the method according to the invention, the manufacture of a channel plate consisting of straight fibres and having the shape of a cylinder with a circular base, the thickness of the cylinder being small with respect to the diameter, is taken by way of example. However, the method is applicable to numerous other shapes of cylindrical or prismatic plates whose base is not a circle.

Figure 1:
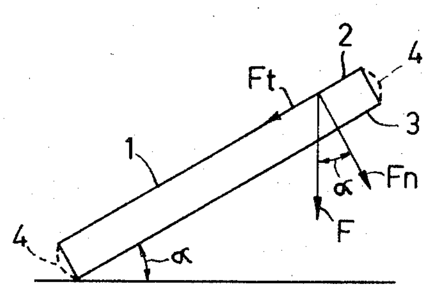
FIG. 1 shows the decomposition of a pressure force which acts at an angle on the surfaces of a channel plate consisting of straight fibres and which has a component which is perpendicular to the plate surfaces and another component which is tangentially directed with respect to these surfaces.
Figure 2:
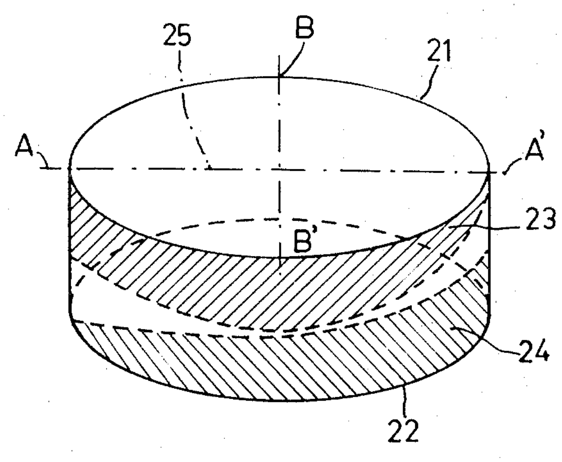
FIG. 2 is a perspective diagrammatic view of the contact surfaces between a plate and a die used for exerting a pressure force which acts on the plate surfaces at an angle.

FIG. 1 shows the principle of the deformation method of a fibre plate 1 under the influence of a pressure force which is exerted thereon at an angle. By means of a die having a given configuration, for example, as shown in the FIGS. 2, 3 and 4, a pressure force F is exerted at an angle on each of the surfaces 2 and 3 of the plate 1. This force F can be resolved into a component Fn which is perpendicular to the said surfaces, and a component Ft which is tangential to these surfaces.

Using known heating and cooling means (not shown in the Figures), a given temperature distribution is at the same time realized inside the plate. This temperature distribution is such that the planes which are parallel to the plate surfaces are isothermal, the variation of the temperature according to a perpendicular to the surfaces being such that in given thickness portions of said plate a temperature gradient exists which is dependent of the perpendicular displacement with respect to the planes, the temperature in said thickness portions being between the highest annealing temperature and the softening temperature of the glass used. Moreover, this temperature distribution does not cause any significant deformation of the die.

The glass in the said thickness portions of the plate is in a state between the elastic state and the viscous state. In this intermediate state the glass retains part of its elastic properties and can undergo permanent deformation. The fact that the glass still retains part of its elastic properties allows the transfer of stresses inside the plate and also the homogenization of this transfer. Under the influence of the stresses attributed to the forces F, and more in particular under the influence of the tangentially directed components Ft of the forces F, a relative shift occurs of the various layers of basic material which are parallel to the plate surfaces, in particular of the surface 2 with respect to the surface 3, these two surfaces remaining substantially parallel, whilst the direction of the shift corresponds to the direction of the component Ft.

The length over which the shifts occur is a function of the physical condition of the glass and of the temperature of the glass. In the thickness portions where the glass is in a state between the viscous state and the elastic state and where there is also a temperature gradient, the shifts of the various layers are combined such that the fibers are permanently curved.

The angle $\alpha$, formed by the pressure force F and the force Fn which is directed perpendicular to the plate surfaces preferably does not deviate much from the friction limit angle between the die surface and the plate surface. The transfer of the stress from the pressure force which acts at an angle is effected more effectively than if the angle where larger.

Because a die made of carbon was used for the tests, a value of 15° is chosen for the angle $\alpha$, the angle being slightly smaller than the limit angle. If the angle $\alpha$ is smaller than the limit angle, the curvation of the channels is less pronounced.

Without further intervention, the components which are directed perpendicular to the surfaces would cause a barrel-like swelling at the circumference as denoted by a broken line 4. The fibres are then subjected to multi-directional bending which is directed according to the diameters of all sections which are perpendicular to the surfaces, which results in disuniformity of the curvation inside the plate.

This possible drawback is eliminated in a preferred embodiment according to the invention. The plate is then clamped in a die having a shape such that the multi-directional effects of the components directed perpendicular to the surfaces of the pressure force which engages at an angle can be brought in the direction of the shift and be "channeled". Adapted to a cylindrical plate, the interior of the die according to the invention has the shape of a cylinder consisting of two equal parts, one of which can slide on the other. Each part has sides of unequal height such that the contact surfaces of said die and the plate can obtain the special geometry shown in FIG. 2.

The contact with the plate surfaces is effected on the one side via the circular surfaces 21 and 22, and via the side surface of the plate along the shaded areas 23 and 24 on the other side. The direction of the shift of the surface 21 with respect to the surface 22 is denoted by an arrow 25. These side surfaces have a symmetry plane which is the plane according to the diameter AA' which is perpendicular to the plate surfaces.

Figure 3:
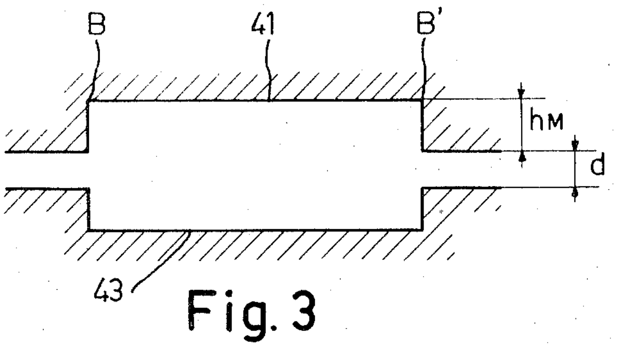
FIG. 3 is a sectional view of the die according to the plane which contains the diameter BB' and which is directed perpendicular to the plate surfaces.

For each die part the contact height has a maximum value in the section which is perpendicular according to the diameter BB', perpendicular to AA', and a minimum value in the section according to AA'. The section of the die according to BB', shown in FIG. 3, is rectangular. This Figure also shows the maximum height $h_M$ of the side contact surface according to this section, and also the clearance (for example, approximately 0.2 mm) which is required to enable the sliding of the one die part 41 on the other die part 43.

Figure 4:
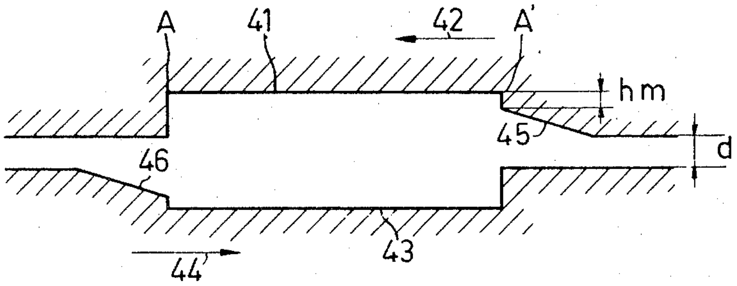
FIG. 4 is a sectional view of the same die according to the plane which is perpendicular to the diameter BB' and which contains the diameter AA' which corresponds to the shift direction.

The section according to the axis AA' which is shown in FIG. 4 has a completely different shape. In this Figure it is assumed that the movement of the part 41 takes place in the direction of the arrow 42, and that the movement of the part 43 takes place in the direction of the arrow 44. The shape of the section depends on the direction of these movements. The section of the lower part of the die is the same as that of the upper part except for a 180° rotation about an axis which, in the centre of the plate, is perpendicular to the plate surfaces.

Each section has a chamfer 45, 46 for the upper part and the lower part such that the lateral contact height between the die and the plate is minimum and equal to $h_m$.

For example, on the upper part this minimum contact height is reached in point A'. Going from the section according to BB' to the section according to AA' on the same part, the contact height h progressively decreases from $h_M$ to $h_m$ when moving from B' to A' or from B to A'; as regards the chamfer 45, the surface which is equal to zero according to the plane BB' becomes maximum in the point A' according to the plane AA'. Along the half circle circumference B'AB the contact height is, for example, constant and equal to the maximum value, even though this is not absolutely necessary.

The pressure forces F which act on the plate surfaces at an angle via the die are parallel to the section according to AA', and in this direction the one plate surface is shifted with respect to the other one.

Under the influence of the pressure force, and due to the special interior geometry of the die, the effect of the components perpendicular to the plate surfaces loses its rotation symmetry which it would have if the strips 23 and 24 (shaded) where not provided, or if the height of these strips were constant.

Figure 5:
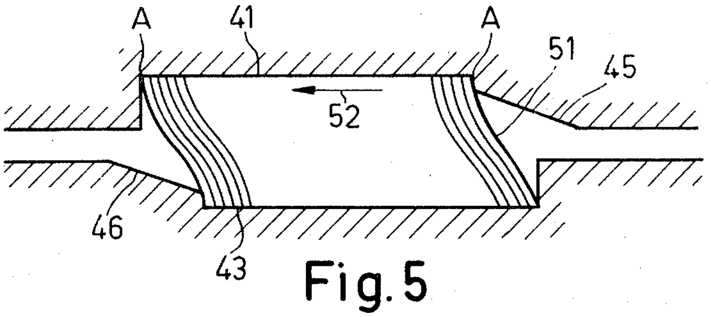
FIG. 5 is a sectional view of the plate inside the die according to the plane of FIG. 4, but after the shift according to the direction AA'.

The behaviour of a plate clamped in such a die is governed by a combination of the effect of the perpendicularly directed components on the one side and the effect of the tangentially directed components on the other side; it should be taken into account that the temperature of the glass is such that the glass can undergo permanent deformation but retains part of its elastic properties which allows the transfer of stresses inside the glass. These elastic properties allow in particular the transfer of the stresses exerted on the plate by the side edges of the die. The effect of the stresses which are directed perpendicular to the plate surfaces and which are exerted on the fibres which are situated in the straight sections according to diameters which are situated near the direction of BB', i.e., at the circumference of the plate, is reduced. The barrel-like swelling as a result of the bending of the fibres towards the edge of the plate is counteracted by the wide side edges of this die according to said sections. The bending of the fibres is re-oriented according to the direction of the shift which takes place under the influence of the tangentially directed components which result in a shearing effect on the basic material such that the convexity of said bending is rotated in the direction of said shift, the bending also being combined with said shift. The shape imparted to the fibres is denoted by lines 51 in FIG. 5, the shift of 41 with respect to 43 taking place in the direction of the arrow 52.

In the straight sections according to the diameters situated near the direction A' the deformation phenomena are very different. The outward bending of the fibres situated at the circumference under the exclusive influence of the perpendicularly directed components would take place parallel to the surfaces of said straight sections.

However, due to the fact that tangentially directed shearing stresses are also formed, the direction of the bending of given fibres changes, i.e., the fibres situated in A', for example, if the shift takes place from A' to A, this change of direction being such that the convexity of this bending is regularly rotated in the sense of the shift as far as all fibres which are situated in the section under consideration are concerned. Like before, the said bending is combined with the shift so as to obtain a curve as denoted by 51 in FIG. 5.

In the straight sections according to the diameters between AA' and BB' the phenomena result partly from what happens in the sections according to BB' and partly from what happens in the sections according to A'. The longer the distance from BB', the less it is necessary to re-orientate the bending of the fibres in the plate portion situated to the right of B' in FIG. 4 in the direction and the sense of the shift, which implies that it is less necessary to counteract the outward bending movement of the fibres, which means a reduction of the height of the die edges going from B' to A' or from B' to A'.

In this embodiment according to the invention the effect of the fibre bending which is due to the perpendicularly directed components of the pressure force is generally reorientated throughout the entire plate and also in a uniform manner in the direction of the shift, so that after the deformation all channels are situated in planes which are approximately parallel to the direction of the shift and to the pressure forces which act on the plate at an angle.

In this embodiment according to the invention it is possible to impart types of curve to the fibre plate by intervention in the temperature distribution according to a perpendicular to the surfaces of the fibre plate, this temperature distribution being realized during the various heating and cooling phases.

For the sake of simplicity it will be assumed hereinafter that the non-uniform temperature distribution relates to the entire thickness of the plate. The invention, of course, also relates to the case where the non-uniform temperature distribution is realized in one or more thickness portions of the plate, the operations performed to realize the method remaining the same.

This temperature distribution can be symmetrically realized with respect to the symmetry plane which is parallel to the plate surfaces.

To this end, the plate is, for example, uniformly heated to a temperature near the softening temperature of the glass, after which the plate surfaces are cooled such that the temperature inside the plate is higher than the temperature of the glass near the surfaces; however, the latter temperature is always higher than the highest annealing temperature of the glass. The deformation of the channels is then as shown in FIG. *6a*. This deformation has a bending point in the centre of the plate.

Figure 6A:
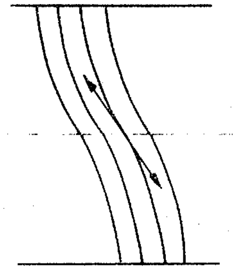
FIG. 6a shows the deformation of fibres, the temperature being the same on the two plate surfaces and being lower than the temperature inside the plate.
Figure 6B:
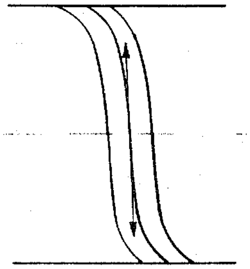
FIG. 6b shows the deformation of fibres, the temperature being the same on the two plate surfaces and being higher than the temperature inside the plate.

In an other sequence of operations, the plate surfaces are further heated after the plate has been heated to a temperature between the highest annealing temperature of glass and its softening temperature, so that the temperature of these surfaces is higher than the temperature inside the plate, however, without the softening temperature being exceeded. The deformation thus obtained is shown in FIG. 6a.

The temperature distribution according to the invention can also be asymmetrically realized.

The temperature then increases from one surface to the other, but remains between the highest annealing temperature and the softening temperature of the glass.

The temperature of the coldes plate surface (cold surface) can be lower or higher than the annealing temperature.

Figure 7B:
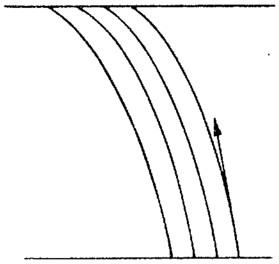
FIG. 7b shows the deformation of fibres, the temperature not being the same on the two plate surfaces, one temperature being higher than the highest annealing temperature of the glass used.
Figure 7A:
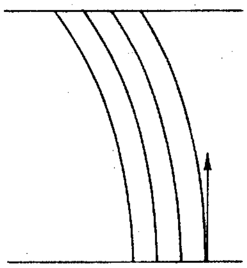
FIG. 7a shows the deformation of fibres, the temperature not being the same on the two surfaces and one temperature being lower than the highest annealing temperature of the glass used.

The deformation thus obtained is as shown either in FIG. 7a or in FIG. 7b.

In FIG. 7a the curvation of the channels is equal to zero on the cold plate surface, and has a value other than zero on the other plate surface (hot surface).

In FIG. 7b the curvation is unequal to zero both on the cold and on the hot plate surface.

In order to increase the efficiency of the method, a plate consisting of curved fibres, for example, the fibres obtained by means of a symmetrical temperature distribution, can of course be cut in half parallel to the plate surfaces. In this manner two plates are obtained which are identical to the plates obtained by an asymmetrical temperature distribution during deformation.

According to another concept of the method according to the invention the intermediate body used for exerting the stress on the plate is formed by two blocks, each block being attached to one of the surfaces of the fibre plate.

The plate is again heated to a temperature in the described range. The blocks have the property of a solid body as regards this temperature.

Figure 8:
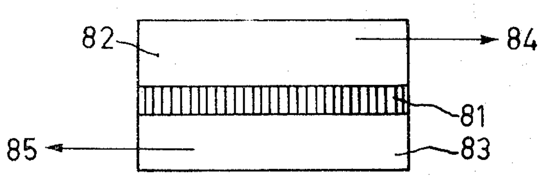
FIG. 8 shows a fibre plate with two blocks, one of which is connected on each plate surface, these blocks enabling a stress to be exerted in the form of a pressure force or a tensile force which is notably parallel to the plate surfaces (shearing stress)

An assembly obtained according to this concept of the method is shown in FIG. 8. The fibre plate is denoted by 81, and two blocks provided on the plate are denoted by 82 and 83. The forces 84 and 85 exerted on these blocks are parallel and, if desired, can act on the surfaces at an angle, but can alternatively be parallel to the plate surfaces as will be demonstrated hereinafter.

According to this embodiment one of the blocks can be permanently connected to the plate, whilst the other block is arranged to be displaced in a plane parallel to the side faces of the plate.

In order to obtain proper bonding, the basic material of the blocks must have a thermal expansion coefficient which differs only little from that of the glass of the fibre plate. Moreover, the weld joining the plate to the block and the block itself must be capable of withstanding the stress exerted at the deformation temperature without undesired deformation occurring.

According to this concept of the method the blocks serve a dual purpose. On the one hand, the blocks serve for exerting the tensile or pressure stresses. On the other hand, after each fibre has been attached to said blocks, these blocks actually represent also a rigid mechanical connection between the various channels on each of the faces of the plate, this connection counteracting the bending of the plate during its deformation under the influence of the pressure or tensile forces. As a result, these forces need not necessarily contain components which are directed perpendicular to the plate as in the previous concept of the method, i.e., they may be parallel to the plate surfaces.

As regards the former concept, the latter concept of the method has the advantage that, as a result of the rigid connection between the fibres via said blocks, per shift the displacements will be equal for all fibres. In this manner a more uniform curvation of the channels in the interior of the plate is obtained.

The basic material of the blocks is preferably an iron-nickel or a ferro-chronium alloy which can be attached to the various kinds of glass forming the channel and the soluble core, the expansion coefficient of said basic material being preferably of the same order ($100\times10^{-7}$) at a temperature of between 20° and 320°C as that of said glass types.

After the deformation of the plate the blocks are removed by means of a solvent which can dissolve either the weld glass or the jacket glass and the core glass of the fibre.

According to another technique, thin plate portions are cut from the plate after deformation.

The said blocks are advantageously made of glass having a highest annealing temperature which is higher than that of the plate, the blocks preferably affording welded joints with the glass of the plate which are capable of withstanding mechanical deformation, i.e., bending.

Such kinds of glass can be optimally chosen from the kinds which are dissolved by the same solvents (diluted ClH, for example) as those which dissolve the core glass of the fibres, the said solvents not having an effect on the channels themselves. After the deformation, the assemblies shown in FIG. 8 are immersed in one of said solvents, so that after some time the plate with curved channels is available.

Such kinds of glass are, for example, those which can be welded to other kinds of glass, and where devitrification of the glass occurs at the level of the welded joint which thus obtains a very favourable mechanical strength and a high softening temperature which exceeds that of the assembly formed by these kinds of glass.

Figure 9:
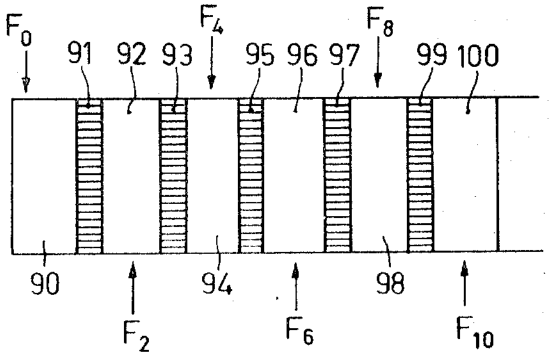
FIG. 9 shows a succession of plates and blocks which are provided thereon by welding and which serve to exert a succession of shearing stresses.

In order to enable use of the method for the bulk manufacture of channel plates, an extension of the method consists in the joining by welding of a plurality of fibre plates which are alternately connected to blocks as shown in FIG. 9. The plates are denoted by the references 91, 93, 95, whilst the references 90, 92, 94 and 95 denote the glass blocks or blocks which are formed from a basic material which can be welded to the plates.

Using known mechanical means, shear stresses are exerted on the blocks 90, 92, 94 and 96 which are parallel to the plate surfaces, for example, the force $F_0$, $F_2$, $F_4$, $F_6$ which all have the same value but which are consecutively exerted, each time in another direction. The bodies thus obtained are subjected to the influence of the same solvents as previously described in order to separate the plates with curved channels from the said bodies.

What is claimed is:

1. A method of manufacturing a channel plate comprising curved channels, comprising the steps of:

a. providing a plate comprising substantially straight fibers comprising a glass material and substantially parallel first and second surfaces, b. adjusting the temperature in said plate to provide in at least a first portion of the plate thickness a temperature differential present along a perpendicular to the plate faces and providing at the interior of said plate various planes that are substantially isothermal, said different temperatures in said thickness portion being within the temperature range where the part of said glass located thereat is in a state between the viscous state and the elastic state and the glass in any other thickness portions being completely out of the viscous state, and then c. subjecting said plate to mechanical stress which comprises a force that acts on said plate surfaces at an oblique angle thereto.

2. A method as in claim 1, wherein said plate thickness first portion in which the temperature differential is present extends over substantially the entire thickness of said plate.

3. A method as in claim 1, comprising the step of providing to said plate a body comprising two parts which slide on each other, each said part contacting at least respective ones of said plate surfaces, after which said stress is produced by a pressure force exerted via said body, whereby said body parts prevent the bending and circumferential swelling phenomena of the plate.

4. A method as in claim 3, wherein said parts further contact respective side surface portions of said plate.

5. A method as in claim 3, wherein the interior of each said part of said body corresponds in shape to the shape of the plate, and said parts respectively comprise side edges that can contact side surface portions of said plate, said side edges each having a variable height which is maximum in that normal section of the plate containing the plate diameter which is perpendicular to the shift direction of one body part with respect to the other during the deformation, and which is minimum in that normal section of the plate containing the plate diameter which is parallel to the shift direction in that part situated upwards from the shift, said height continuously decreasing elsewhere from one section to another in the upward direction of said shift.

6. A method as recited in claim 3, wherein said step of providing said body comprises welding two relatively rigid blocks to respective said plate surfaces, said blocks comprising material having both a softening temperature exceeding said temperature at said plate thickness first portion and a thermal expansion coefficient substantially equal to that of said glass material and, wherein after said application of said stress, removing said blocks by dissolving one of the weld material, on one hand, and the jacket glass and the core glass thereof on the other hand.

7. A method as recited in claim 6, wherein said blocks essentially consist of one of an iron-nickel alloy and an iron-chromium alloy.

8. A method as claimed in claim 6, wherein said blocks are of glass.

9. A method as claimed in claim 8, wherein said glass of said welded joint, the glass of said fiber cores, and said glass material of said blocks are each susceptible to attack by a common reagent.

10. A method as in claim 1, wherein at least one plate thickness portion there is present a non-uniform temperature distribution, said distribution being symmetrical with respect to the center plane of said one thickness portion.

11. A method as in claim 10, wherein said temperature is at a maximum at said center plane.

12. A method as in claim 10, wherein said temperature is at a minimum at said center plane.

13. A method as in claim 1, wherein at at least one thickness portion of said plate said temperature is non-uniform and is distributed such that said temperature increases along the thickness direction of said plate from one plate edge to the other.

14. A method of simultaneously manufacturing a plurality of plates comprising curved channels, comprising the steps of:

a. forming a stack containing alternately disposed blocks and plates having straight fibers, both ends of said stack being formed by respective ones of said blocks, said blocks being connected to respective plate surfaces by welded joints, said plates consisting essentially of first material that is at a first temperature range in a state between the viscous state and the elastic state and said blocks consisting essentially of second material having a softening temperature exceeding said first temperature range;

b. adjusting the temperature in said plate to provide in at least a first portion of the plate thickness a temperature differential extending along a perpendicular to the plate faces and providing at the interior of said plate various planes that are substantially isothermal, and c. applying parallel forces of substantially the same value on the respective blocks, the direction of these forces successively changing from block to block.

* * * * *